(No Model.)

W. W. SHIRLEY.
RELIEF VALVE.

No. 569,943. Patented Oct. 20, 1896.

Witnesses:
Geo. M. Anderson
Philip C. Mass.

Inventor:
W. W. Shirley
by E. W. Anderson
his Atty.

UNITED STATES PATENT OFFICE.

WILLIAM W. SHIRLEY, OF WESTLAKE, LOUISIANA.

RELIEF-VALVE.

SPECIFICATION forming part of Letters Patent No. 569,943, dated October 20, 1896.

Application filed October 25, 1895. Serial No. 566,927. (No model.)

*To all whom it may concern:*

Be it known that I, WILLIAM W. SHIRLEY, a citizen of the United States, and a resident of Westlake, in the parish of Calcasieu and State of Louisiana, have invented certain new and useful Improvements in Relief-Valves; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
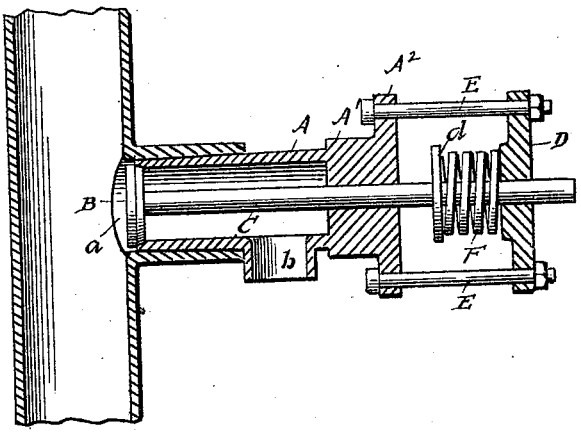
Figure 2:
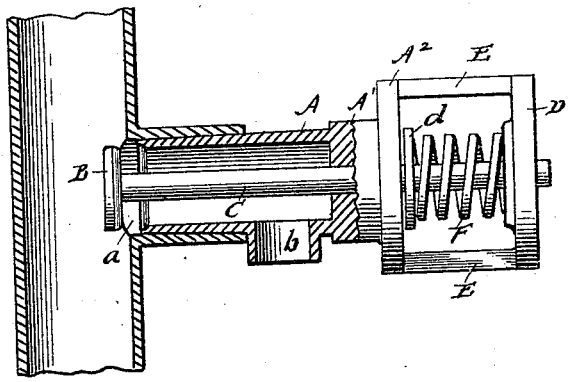

Figure 1 of the drawings is a representation of a sectional view of the invention applied to a pipe with valve closed. Fig. 2 is a similar view showing yoke integral with casting, with valve open.

This invention has for its object the provision of an automatic relief or drain valve for water systems, such, for instance, as the systems which are employed in factories and other plants for use in case of fire. In such systems it is frequently necessary during cold weather to drain all the pipes in order to prevent their freezing and bursting. During such times should a fire occur it has been necessary for some person to go around and close all the drain-cocks before the requisite pressure could be obtained.

The present invention provides an automatic drain attachment which when the pressure in the system is reduced opens of itself to empty the pipes and which when the pump is started which supplies the system or the water-pressure is otherwise supplied immediately closes.

With this object in view the invention consists in the novel construction and combination of parts, all as hereinafter described, and pointed out in the appended claim.

Referring to the accompanying drawings, the letter A designates a chambered shell or casting having at one end an inlet $a$, which is designed to be connected with a pipe of the system. Near its opposite end is a lateral discharge branch or opening $b$, through which the drain takes place.

The orifice $a$ is formed with a valve-seat to receive a valve B, which unseats away from the said orifice into the pipe of the water system. Said valve is carried by a rod or stem C, which extends longitudinally through the chamber of the shell and through the head A' thereof, its rear projecting portion having a loose bearing in a yoke-piece D, which is secured upon rods or bolts E, which are in turn held in a flange A² of the head of the shell A. Seated between said yoke-piece and a collar or flange $d$ of the valve stem or rod is a spring F, which is coiled around the said stem or rod and whose action is such as to normally hold the valve unseated, that is, when said valve is free from pressure from the water system. It will be apparent, therefore, that so soon as the pressure is cut off from the system the valve will open and permit the pipe or pipes adjacent thereto to drain. So soon, however, as the pressure is again restored the valve will close.

These attachments are to be applied to the water system at points where they will be the most effective or which are most convenient, and as many of them can be employed as may be necessary in any particular system. In systems already in existence the ordinary drain-cocks can be removed and the improved ones fitted in place thereof, or the pipes may be tapped at any suitable point for this purpose.

Having thus described my invention, what I claim as new, and desire to secure by Letters Patent, is—

In a relief-valve of the character described the chambered shell or casting in the form of a tubular plug open at one end, and closed at its outer end by a thickened and flanged head having therethrough an opening for a valve-stem, an open spring box or housing carried by said thickened and flanged end, and separated thereby from the chamber of the casting, said casting having a lateral discharge-opening intermediate of its ends, in combination with the valve, its stem, and the spring coiled around said stem within the open box or housing and having a bearing at one end thereon and at the other end upon said stem, substantially as specified.

In testimony whereof I affix my signature in presence of two witnesses.

W. W. SHIRLEY.

Witnesses:
R. P. FORISTER,
CLAIRVILLE ELENDAR.